(12) United States Patent
Gledhill

(10) Patent No.: US 7,003,105 B2
(45) Date of Patent: Feb. 21, 2006

(54) TELEPHONE HANDSET SHOULDER REST AND METHOD OF USING AND MAKING SAME

(76) Inventor: Dale C. Gledhill, 790 W. 1760 South, Salt Lake City, UT (US) 84104

( * ) Notice: Subject to any disclaimer, the term of this patent is extended or adjusted under 35 U.S.C. 154(b) by 345 days.

(21) Appl. No.: 09/758,478

(22) Filed: Jan. 11, 2001

(65) Prior Publication Data

US 2002/0090084 A1     Jul. 11, 2002

(51) Int. Cl.
*H04M 1/00*     (2006.01)

(52) U.S. Cl. ...................................... 379/449
(58) Field of Classification Search ................ 379/449, 379/455, 446, 454

See application file for complete search history.

(56) References Cited

U.S. PATENT DOCUMENTS

| | | |
|---|---|---|
| 4,238,647 A | 12/1980 | Maspoli |
| 4,320,262 A | 3/1982 | Read |
| D273,677 S | 5/1984 | Martinsen |
| D276,229 S | 11/1984 | Heilner |
| D278,057 S | 3/1985 | McMaster |
| D287,496 S | 12/1986 | Bricker |
| D290,956 S | 7/1987 | Witham |
| D294,025 S | 2/1988 | Boykiw |
| 4,759,058 A | 7/1988 | Sutton |
| 4,817,139 A * | 3/1989 | Russo ........................ 379/449 |
| D308,062 S | 5/1990 | Leoni et al. |
| 4,961,223 A | 10/1990 | Sutton |
| D315,353 S | 3/1991 | Greenwood, Sr. et al. |
| D323,828 S | 2/1992 | Martinsen et al. |
| D323,829 S | 2/1992 | Martinsen et al. |
| 5,115,465 A | 5/1992 | Freer |
| D350,356 S | 9/1994 | Wood |
| 6,341,163 B1 * | 1/2002 | Castle et al. ................. 379/449 |

* cited by examiner

*Primary Examiner*—Jack Chiang
(74) *Attorney, Agent, or Firm*—Workman Nydegger

(57) ABSTRACT

A shoulder rest can be secured to a telephone handset without being particularly shaped to fit the contours of that particular handset. Below a contoured portion adapted to fit against a user's shoulder, the shoulder rest includes a concave or cut-out portion between two base portions that contact the handset. Because of the cut-out portion, the rest can fit a handset that is flat or curved, regardless of the contour or radius of curvature. A flat, flexible strap of material preferably spans the base portions to increase the contact between the rest and the handset.

22 Claims, 2 Drawing Sheets

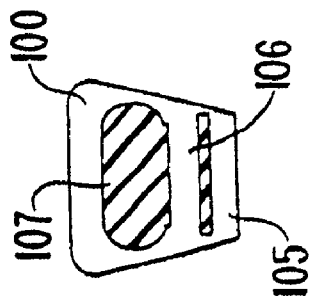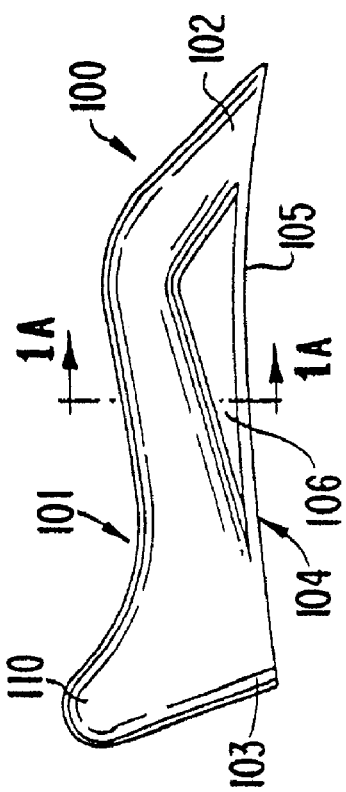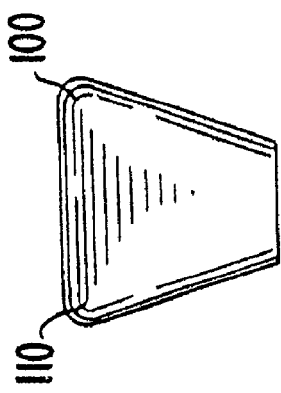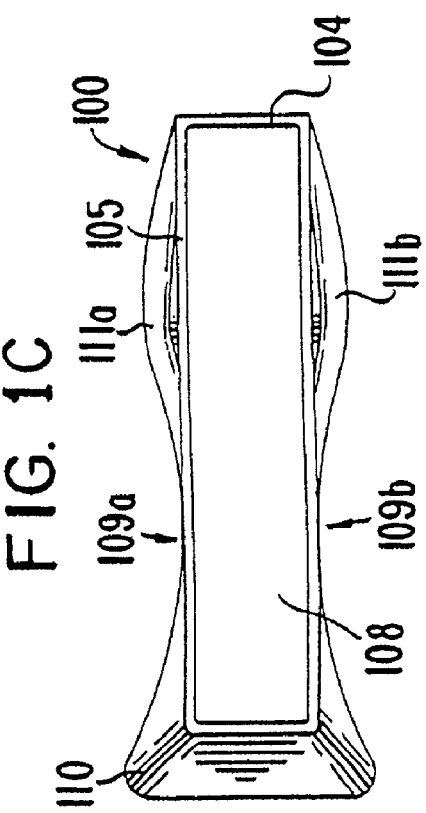

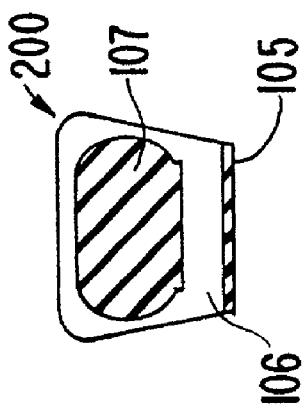
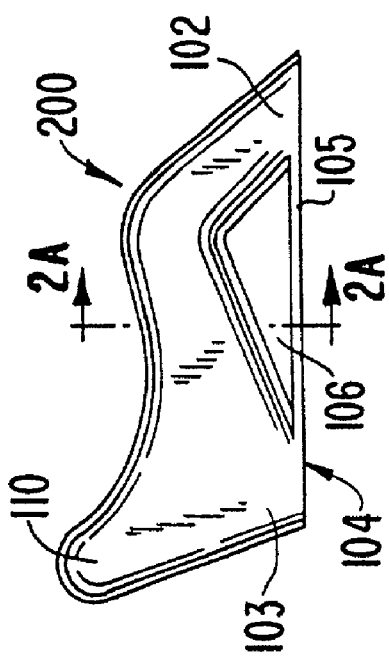
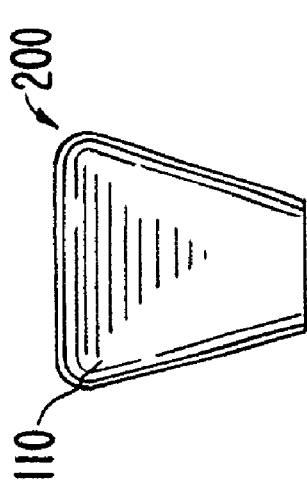
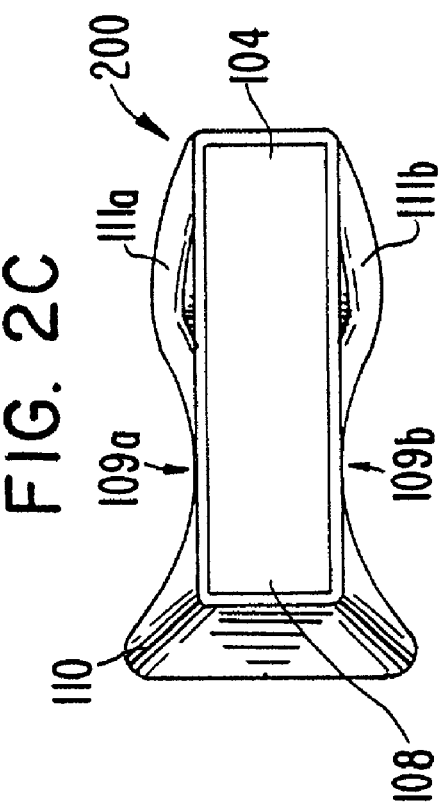

TELEPHONE HANDSET SHOULDER REST AND METHOD OF USING AND MAKING SAME

FIELD OF THE INVENTION

The present invention relates to the field of telephones and telephone accessories. More specifically, the present invention relates to a shoulder rest that can be adhered to the back of a telephone handset to better able the user to cradle the phone between his or her shoulder and ear so as to allow hands-free use of the phone handset. The shoulder rest of the present invention can be applied to any type of phone handset, including, but not limited to, a regular, cordless or wireless telephone handset.

BACKGROUND OF THE INVENTION

In modern society and business, telecommunications are vitally imporant. Telephones can be used to communicate with friends, family, clients, employees, colleagues and business partners around the world. Even in remote areas where land-based telephone lines have not been placed, wireless to satellite telephone systems can provide basic phone service.

Normally, a phone conversation is conducted using a telephone handset. The handset incorporates a speaker which is pressed against or held to the user's ear and a microphone held near the user's mouth. With the speaker, an audio signal from the phone system is transduced into audible sound so that the user can hear what was said by the other party or parties to the phone call. With the microphone, the utterances of the user are transduced into an audio signal that can be transmitted electronically to the other party or parties to the phone call.

In a conventional phone, the handset is connected to a phone base by a phone cord. In a cordless phone, the handset communicates wirelessly with a base unit using radio frequency ("RF") transmissions. In either case, the phone base unit is connected or wired into a public switched telephone network ("PSTN").

With a wireless or cellular telephone, the entire phone unit is built into the handset. Transceiver bases are the distributed throughout a service area to communicate wirelessly with the mobile phone unit. Again, the mobile phone units and the transceiver bases communicate using radio frequency transmissions. The network of transceiver bases is also conencted to a PSTN to allow the mobile phone unit to connect to any conventional or other phone unit on the network.

Because of the tremendous communications ability provided by modern telecommunication, many people spend a great deal of time talking on the telephone. Consequently, people often desire to engage in other activities will carrying on a telephonic conversation. For example, a person at home may wish to carry on a phone conversation while preparing a meal or performing other household task. Similarly, a person in an office may wish to work on his or her computer or reference a file or documents while conduting a phone conversation. These tasks may be incident to retrieving information needed in the phone conversation.

In order to allow a person to conduct a phone conversation while also performing other tasks, it is helpful to allow that person's hands to be free for the other tasks to be performed. Consequently, rather than using a hand to hold the telephone handset to his or her mouth and ear, the user must employ some other means of positioning the speaker and microphone of the handset at his or her ear and mouth, respectively.

There are generally two means of properly positioning the speaker and microphone of a telephone unit while leaving the user's hands free for other tasks. The first approach involves incoporating the speaker and microphone in a headset that can be worn on the head of the user so as to properly position the speaker and microphone near the user's ear and mouth, respectively. Such a headset may replace or supplement a traditional handset. The headset may hang from or be clipped to the user's ear or may include a band that rests across the top of the user's head.

When a headset is not desired or available, the user may simply cradle the handset in his or her neck. The back of the handset is placed against the user's shoulder. The user's head is then cocked to one side to place the user's ear against the speaker. In this way, the handset is clasped between the user's shoulder and face with the speaker and microphone properly positioned so that the user can conduct a telephone conversation while having his or her hands free.

While this method of conducting a hands-free phone conversation works, it may be uncomfortable for the user, particularly if the handset is small and the user must struggle to hold the small handset between his or her shoulder and ear. Consequently, shoulder rests have been developed. The sholder rest is adhered to the back of the phone handset to effectively increase the depth of the handset. This makes the handset easier to hold between a user's shoulder and ear becuase the user's head is cocked to one side at a minimal angle.

U.S. Design Pat. No. 273,677 to Martinsen, entitled "Phone Sholder Rest" is exemparly of the prior art. Martinsen teaches a rigid member that can be adhered to the back of a phone handset and which provides a contour adapted to accomodate the curve of a user's sholder. Other examples of this art are provided by U.S. Design Pat. No. 276,339 to Heliner, entitled "Telephone Shoulder Rest;" and U.S. Design Pat. No. 278,057 to McMaster, entitled "Shoulder Rest for Telephone Handset."

Other prior art in this area include sholder rests that are incorporated into the handset rather than adhered to the handset. For example, U.S. Pat. No. 4,238,647 to Maspoli, entitled "Telephone Handset Having Shoulder Rest and Adjustable Earpiece," teaches a shoulder rest that can be extended from and retracted into the back of the telephone handset. U.S. Pat. No. 4,320,262 to Read, entitled "Telephone Handset with Integral Shoulder Rest," similarly teaches a phone handset with a retractable shoulder rest.

These and other prior art references illustrate the current state of this art. While these shoulder rests answer the purpose for which they were designed, they have a number of shortcomings. For example, prior telephone handset shoulder rests are either rigid members that are adapted to fit a particularly shaped handset or are integrated into the handset. Consequently, there is a need in the art for a single handset that can be provided to users for use with a variety of differently shaped handsets.

SUMMARY OF THE INVENTION

The present invention meets the above-described needs and others. For example, the present invention provides a shoulder rest for use with a telephone handset which is both comfortable, functional and easily adapted to a variety of sizes and shapes of telephone handset.

Additional advantages and novel features of the invention will be set forth in the description which follows or may be learned by those skilled in the art through reading these materials or practicing the invention. The objects and advantages of the invention may be achieved through the means recited in the attached claims.

The present invention may be embodied and described as a shoulder rest for use on a telephone handset. The shoulder rest of the present invention includes: a first portion for abutting against a user's shoulder; base portions for abutting against the telephone handset; and a cut-out portion between the base portions allowing the shoulder rest to conform to differently shaped telephone handsets. Preferably, the first portion is curved to accomodate the user's shoulder.

The shoulder rest of the present invention also preferably includes a flat, flexible strap of material between the base portions and partially enclosing the cut-out portion. An adhesive on the strap and the base portions is used to adhere the shoulder rest to the telephone handset.

The first portion preferably narrows along the length of the shoulder rest from a front end of the shoulder rest to a narrowest portion and then widens again as illustrated in the accompanying figures. The first and base portions of the shoulder rest are preferably part of a hollow body of the shoulder rest.

The present invention also encompasses the methods of making and using the shoulder rest described above. Specifically, the present invention encompasses a method of making a shoulder rest for use on a telephone handset by forming a first portion of the shoulder rest for abutting against a user's shoulder; forming base portions of the shoulder rest for abutting against the telephone handset; and forming a cut-out portion of the shoulder rest between the base portions allowing the shoulder rest to conform to differently shapped telephone handsets. Preferably, these forming steps are performed by injecting an appropriate material into a mold. A prefered material is polyvinyl chloride or PVC.

The method of the present invention preferably also includes forming a flat, flexible strap of material between the base portions and partially enclosing the cut-out portion. This strap is preferably formed integrally with the base portions of the shoulder rest.

The method of the present invention may also include placing an adhesive on the strap and the base portions for adhering the shoulder rest to the telephone handset and adhering the shoulder rest to a telephone handset.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 1 is a side view of a first preferred embodiment of the present invention.

FIG. 1A is a cross-sectional view of the embodiment of the present invention illustrated in FIG. 1 taken along line A—A.

FIG. 1B is a front end view of the embodiment of the present invention illustrated in FIG. 1.

FIG. 1C is a bottom view of the embodiment of the present invention illustrated in FIG. 1.

FIG. 2 is a side view of a second preferred embodiment of the present invention.

FIG. 2A is a cross-sectional view of the embodiment of the present invention illustrated in FIG. 2 taken along line A—A.

FIG. 2B is a front end view of the embodiment of the present invention illustrated in FIG. 2.

FIG. 2C is a bottom view of the embodiment of the present invention illustrated in FIG. 2.

Throughout the drawings, identical elements are labeled with idential reference numbers. Consequently, redundant explaination of elements previously described may be omitted.

DETAILED DESCRIPTION OF THE PREFERRED EMBODIMENTS

The present invention provides a novel shoulder rest for use with a telephone handset. The phone rest is preferably made of a flexible material and has a cut-out or concave portion between two base portions that contact the phone handset. An integral flat member spans the concave portion between the two base portions that contact the phone handset and is in contact with the phone handset when the rest is installed. In this way, as will be described below, the rest of the present invention can conform to handsets with widely varying shapes and contours.

Using the drawings, the preferred embodiments of the present invention will now be explained. FIG. 1 is a side view of a preferred embodiment of a shoulder rest (100) for a telephone handset according to a first embodiment of the present invention. As shown in FIG. 1, the shoulder rest (100) of the present invention preferably has a contoured portion (101) that is curved and shaped to fit the curve of a user's shoulder.

At one end, the contoured portion (101) ends in a prominence (110). FIG. 1B shows a front end view of the rest (100) at the end with the prominence (110).

The main body of the shoulder rest (100) extends from the contoured portion (101) to two separated base portions (102, 103) on the opposite side of the rest (100). The base portions (102, 103) are in contact with and adhere to the back of the phone handset when the rest (100) is installed.

Between the two base portions (102, 103), the main body of the rest (100) retreats inward to form a concaved or cut-out portion (106). Because of the concave portion (106) between the two base portions (102, 103), the rest (100) of the present invention can be fit to a back surface of a phone handset that is flat or curved. Moreover, if the back of the phone handset where the rest (100) is adhered is curved, the radius or contour of the curvature does not affect the ability of the shoulder rest (100) of the present invention to conform thereto.

A flat, flexible strip of material (105) is preferably integrally formed as part of the rest (100) and runs between the two base portions (102, 103) and partially encloses the concave portion (106). This flat, flexible strip of material can conform to the back of a telephone handset to provide more contact between the rest (100) and the phone handset to better secure the rest (100) to the handset.

FIG. 1C shows a bottom view of the rest (100). The bottom surface (104) of the rest (100) is the surface secured or adhered to the telephone handset. As shown in FIG. 1C, the bottom of the strip (105) and the base portions (102, 103) may be covered with an adhesive (108) that is used to secure the rest (100) to a telephone handset. A protective paper or other cover (not shown) may be placed over the adhesive (108) to preserve the adhesive (108) until it is used to secure the rest (100) to a telephone handset.

FIG. 1C also shows additional preferred contouring of the rest (100) of the present invention. For example, moving along the length of the rest (100) from the forward prominence (110), the rest (100) preferably narrows with symmetrical side contoured portions (109a, 109b). The rest (100) then preferably widens (111a, 111b). This contouring optimally adapts the rest (100) to fit comfortably between the shoulder and ear of a user when the handset is so held.

The phone rest (100) of the present invention is preferably made of a flexible material such as a plastic or rubber. In one preferred embodiment, polyvinyl cholride ("PVC") is injected into a mold to form the rest (100) of the present invention. The mold may be made of two halves divided along the length of the rest (100).

FIG. 1A illustrates a cross-sectional view of the rest (100) taken along line A—A of FIG. 1. As shown in FIG. 1A, the main body portion of the rest (100) may be hollow enclosing a cavity (107). This reduces the weight of the rest (100) and the materials required to make the rest (100). The flexible strap portion (105) and the concave or cut-out portion (106) of the rest are also illustrated in FIG. 1A.

FIGS. 2–2C illustrate a second embodiment of the present invention. This second preferred embodiment is in most respects identical to the first embodiment described above. However, the second embodiment is a shoulder rest (200) which is smaller and proportioned differently than the larger first embodiment. The second embodiment (200) is used to illustrate that the shoulder rest of the present invention can be sized, proportioned and scaled as necessary to fit different classes of telephone handsets.

In FIGS. 2–2C, similar or identical structures as described in connection with the first embodiment are given identical reference numbers. Consequently, a redundant explanation of thes elements will be omitted here. It will be understood that the second embodiment merely illustrates a shoulder rest with the same features and elements as the first embodiment which are sized and proportioned differently to accomodate a smaller class of telephone handsets.

As will be understood by those skilled in the art, the shoulder rest of the present invention can be adapted to fit any type of telephone handset, including, but not limited to, a traditional handset wired to a phone base unit, a cordless telephone handset communicating wirelessly with a base unit and a wireless or cellular telephone handset in which the entire phone unit is incorporated into the handset. The term "handset" as used herein encompasses all such telephone handsets.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A shoulder rest for use on a telephone handset, said shoulder rest comprising:
    a first portion for abutting against a user's shoulder;
    base portions extending from said first portion to terminal ends, wherein said first portion and said base portions are part of a hollow body of said shoulder rest, said first portion and said base portions being integrally formed to form said hollow body, said terminal ends of said base portions configured for abutting against different longitudinal portions of a back side of said telephone handset; and
    a cut-out portion between said base portions,
    wherein at least a portion of said base portions are configured to be selectively positioned closer together or farther away from each other so that said shoulder rest can conform to differently shaped telephone handsets.

2. The shoulder rest of claim 1, wherein said first portion is curved to accommodate said user's shoulder.

3. The shoulder rest of claim 1, further comprising a substantially flat, flexible strap of material between said base portions and partially enclosing said cut-out portion.

4. The shoulder rest of claim 3, further comprising an adhesive material on at least a portion of said strap for adhering said portion of said strap to said telephone handset.

5. The shoulder rest of claim 1, wherein said first portion narrows along a length of said shoulder rest from a front end of said shoulder rest to a narrowest portion and then widens again.

6. The shoulder rest of claim 1, further comprising an adhesive material placed on at least a portion of said terminal ends of said base portions.

7. The shoulder rest of claim 1, wherein said base portions are resiliently flexible.

8. A shoulder rest for use on a telephone handset, the shoulder rest comprising:
    a top portion for abutting against a user's shoulder
    a bottom portion for connecting to a backside of a telephone handset, the bottom portion comprising a first and second base portion extending from the top portion to a terminal end, wherein said top portion and said bottom portion are part of a hollow body of said shoulder rest, said top portion and said bottom portion being integrally formed to form said hollow body, wherein at least a portion of the first and second base portions are configured to be selectively positioned closer together or farther away from each other; and
    a flexible strip extending between the first and second base portions.

9. The shoulder rest as recited in claim 8, further comprising an adhesive material disposed on at least a portion of at least one of the flexible strip, the terminal end of the first base portion or the terminal end of the second base portion.

10. The shoulder rest as recited in claim 8, wherein the top portion is curved to accommodate the user's shoulder.

11. The shoulder rest as recited in claim 8, wherein the top portion narrows along a length of the shoulder rest from a front end of the shoulder rest to a narrowest portion and then widens again.

12. The shoulder rest as recited in claim 8, wherein the top and bottom portions are part of a hollow body.

13. The shoulder rest as recited in claim 8, wherein the first and second base portions are resiliently flexible.

14. A shoulder rest for use on a telephone handset, the shoulder rest comprising:
    a first portion comprising means for abutting against a user's shoulder;
    a second portion comprising a first base portion and a second base portion having terminal ends and having a space formed therebetween, wherein said first and said second portion are part of a hollow body of said shoulder rest, said first portion and said second portion being integrally formed to form said hollow body, at least a portion of said first base portion and said second base portion are configured to be selectively positioned closer together or farther away from each other thus increasing or decreasing the size of the space so that the second portion can conform to differently shaped telephone handsets; and means for connecting the second portion to a handset so that the terminal ends of the first and second base portions are configured to abut against different longitudinal portions of a back side of a telephone handset.

15. The shoulder rest as recited in claim 14, wherein the means for abutting against a user's shoulder comprises a curved surface.

16. The shoulder rest as recited in claim 14, wherein the second portion comprises a first base portion and a second base portion having the space disposed therebetween, wherein at least one of the first base portion and second base portion comprising a flexible material.

17. The shoulder rest as recited in claim 16, wherein the flexible material comprises plastic or rubber.

18. The shoulder rest as recited in claim 16, wherein the flexible material comprises polyvinyl chloride.

19. The shoulder rest as recited in claim 14, wherein the means for connecting the second portion to a handset comprises an adhesive material disposed on the second portion.

20. The shoulder rest as recited in claim 14, further comprising means for partially bounding the space on the second portion.

21. The shoulder rest as recited in claim 20, wherein the means for partially bounding the space on the second portion comprises a substantially flexible strap.

22. The shoulder rest as recited in claim 21, further comprising an adhesive material disposed on at least a portion of the substantially flexible strap.

* * * * *